(12) United States Patent
Boldt

(10) Patent No.: US 9,125,527 B1
(45) Date of Patent: Sep. 8, 2015

(54) NUTCRACKER

(71) Applicant: Edward C. Boldt, Menomonee Falls, WI (US)

(72) Inventor: Edward C. Boldt, Menomonee Falls, WI (US)

( * ) Notice: Subject to any disclaimer, the term of this patent is extended or adjusted under 35 U.S.C. 154(b) by 0 days.

(21) Appl. No.: 14/632,004

(22) Filed: Feb. 26, 2015

(51) Int. Cl.
*A47J 43/00* (2006.01)
*A47J 43/26* (2006.01)

(52) U.S. Cl.
CPC ....................................... *A47J 43/26* (2013.01)

(58) Field of Classification Search
CPC ........................................................ A47J 43/26
USPC ........... 99/579, 571, 583, 581, 588, 542, 590, 99/575, 580, 582, 572
See application file for complete search history.

(56) References Cited

U.S. PATENT DOCUMENTS

| | | | | | |
|---|---|---|---|---|---|
| 1,227,570 | A | * | 5/1917 | Black | 99/579 |
| 2,183,804 | A | * | 12/1939 | Bloomfield | 100/213 |
| 2,572,378 | A | * | 10/1951 | Paul | 99/581 |
| 2,697,462 | A | * | 12/1954 | Connor | 99/579 |
| 4,554,736 | A | * | 11/1985 | Rodriguez | 30/120.3 |

* cited by examiner

*Primary Examiner* — Tu B Hoang
*Assistant Examiner* — Phuong Nguyen
(74) *Attorney, Agent, or Firm* — Donald J. Ersler

(57) ABSTRACT

A nutcracker preferably includes a cracker unit, a support structure and a hand held base. The cracker unit preferably includes a support base, a crank unit, a nut base and a pair of jaws. The support base is slidably engaged with the nut base through a pair of guide rods. The pair of jaws are attached to the support base and nut bases. The crank unit preferably includes a lead screw, a ratchet mechanism and a crank arm. A lead screw retainer is retained on the support base and pivotally retains the lead screw. The lead screw nut is retained on the nut base and threadably receives the lead screw. A bottom of the support structure is attached to the hand held base and the nut base plate is attached to a top of the support structure.

13 Claims, 5 Drawing Sheets

US 9,125,527 B1

NUTCRACKER

BACKGROUND OF THE INVENTION

1. Field of the Invention

The present invention relates generally to shelled nuts and more specifically to a nutcracker, which allows hard shell nuts, such as hickory nuts to be cracked in a controlled manner.

2. Discussion of the Prior Art

U.S. Pat. No. 1,227,570 to Black discloses a pecan cracker. U.S. Pat. No. 2,697,462 to Connor discloses a reciprocating jaw type nutcracker.

Accordingly, there is a clearly felt need in the art for a nutcracker, which includes a ratcheting crank for positioning a crank arm, a hand held base and replaceable jaw members.

SUMMARY OF THE INVENTION

The present invention provides a nutcracker, which allows hard shell nuts, such as hickory nuts to be cracked in a controlled manner. The nutcracker preferably includes a cracker unit, a support structure and a hand held base. The cracker unit preferably includes a support base, a crank unit, a nut base, a lead screw nut and a pair of jaws. The support base preferably includes a base plate, a pair of guide rods and a lead screw retainer. The guide rods are pressed into an end of the base plate. The lead screw retainer may be attached to a top of the base plate with fasteners or the like, or made as an integral portion of the base plate. The nut base includes a nut base plate, a pair of bearings and a lead screw nut. The pair of bearings are pressed into an end of the nut base plate. The pair of bearings are sized to receive the pair of guide rods. The lead screw nut may be attached to a top of the nut base plate with fasteners or the like, or made as an integral portion of the nut base plate. One of the jaws is attached to an end of the base plate and the other one of the jaws is attached to an end of the nut base plate, such that thereof face each other. The crank unit preferably includes a lead screw, a ratchet mechanism, a crank hub, a crank arm and a crank pivot arm. The lead screw retainer rotatably retains the lead screw. The lead screw nut threadably receives the lead screw.

The ratchet mechanism is attached to one end of the lead screw and a crank hub preferably extends from an opposing end of the ratchet mechanism. Ratchet mechanisms are well known in the art and need not be explained in detail. One end of the crank arm is retained in the crank hub. The crank pivot arm is pivotally retained in a distal end of the crank arm. The hand held base is large enough to allow a human hand to anchor the nutcracker to a work surface. A bottom of the support structure is attached to the hand held base. A bottom of the nut base plate is attached to a top of the support structure with fasteners, welding or any other suitable process. It is beneficial to angle the cracker unit relative to the hand held base to optimize ergonomics. In use, a nut is inserted between the pair of jaws. The crank arm is rotated until the nut is securely retained between the pair of jaws. The crank arm is then rotated slowly, until the nut cracks.

Accordingly, it is an object of the present invention to provide a nutcracker, which includes a ratcheting crank for optimal leverage, a hand held base and replaceable jaw members.

Finally, it is another object of the present invention to provide a nutcracker, which allows hard shell nuts, such as hickory nuts to be cracked in a controlled manner.

These and additional objects, advantages, features and benefits of the present invention will become apparent from the following specification.

DETAILED DESCRIPTION OF THE PREFERRED EMBODIMENTS

Figure 1:
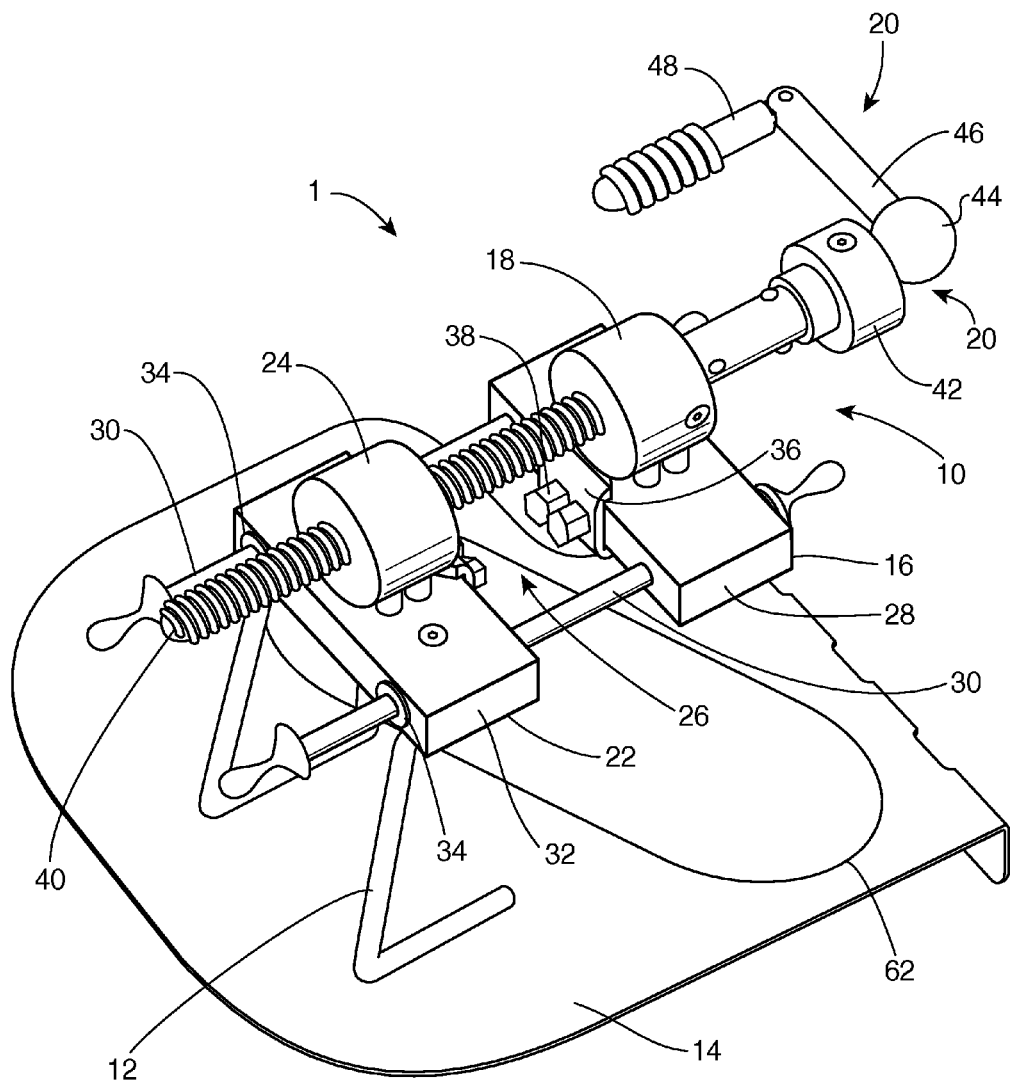
FIG. 1 is a perspective view of a nutcracker in accordance with the present invention.
Figure 2:
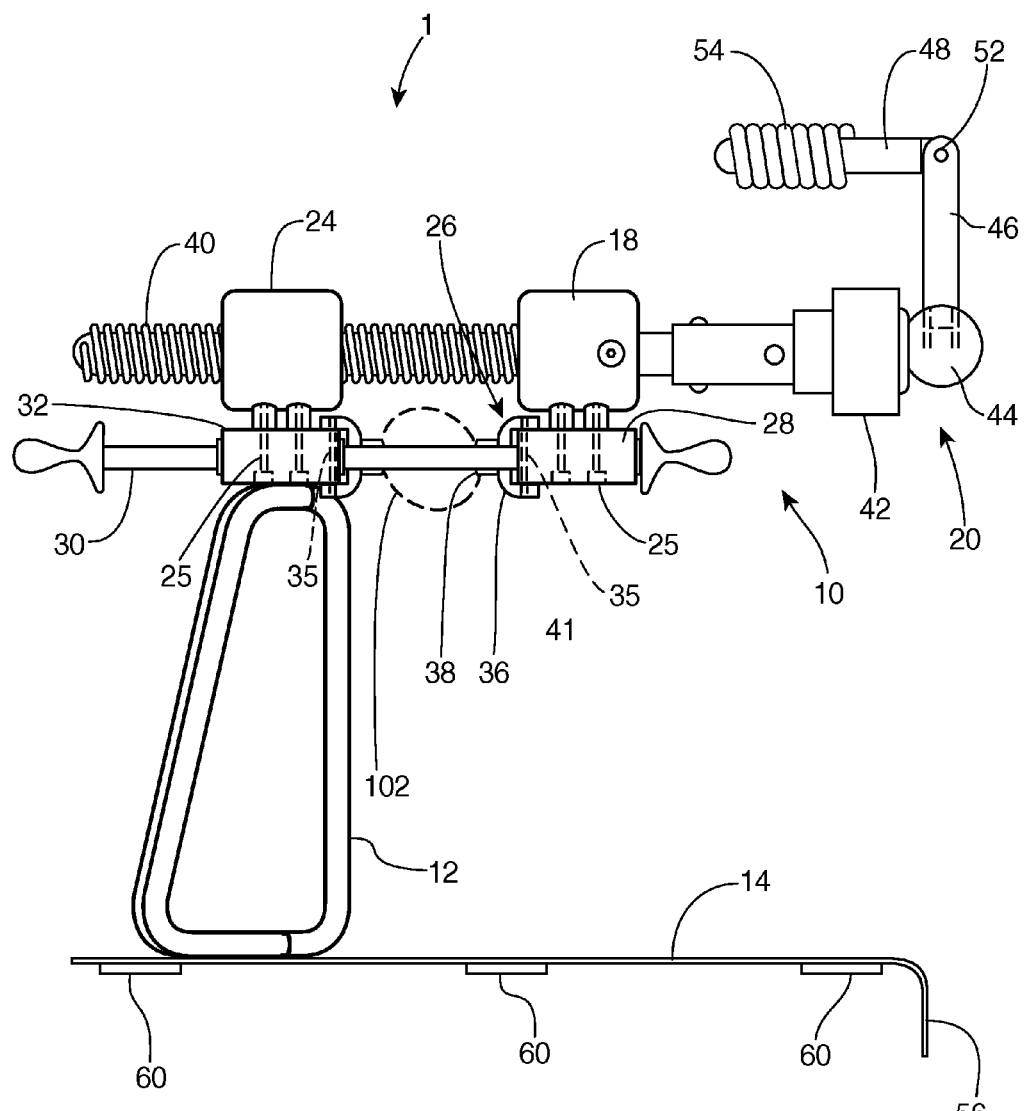
FIG. 2 is a side view of a nutcracker with a nut retained between a pair of jaws in accordance with the present invention.
Figure 3:
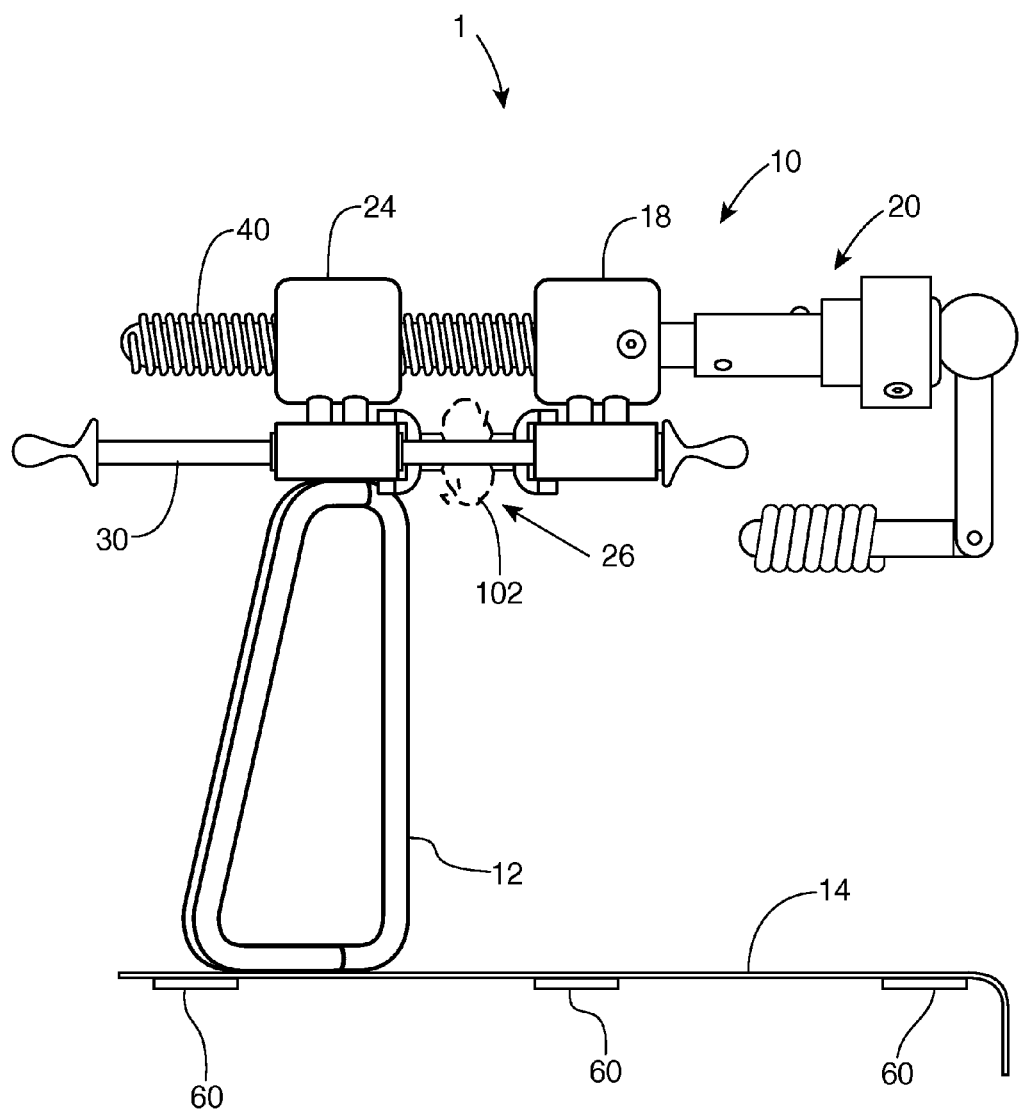
FIG. 3 is a side view of a lead screw rotated to crack a nut retained between a pair of jaws in accordance with the present invention.
Figure 4:
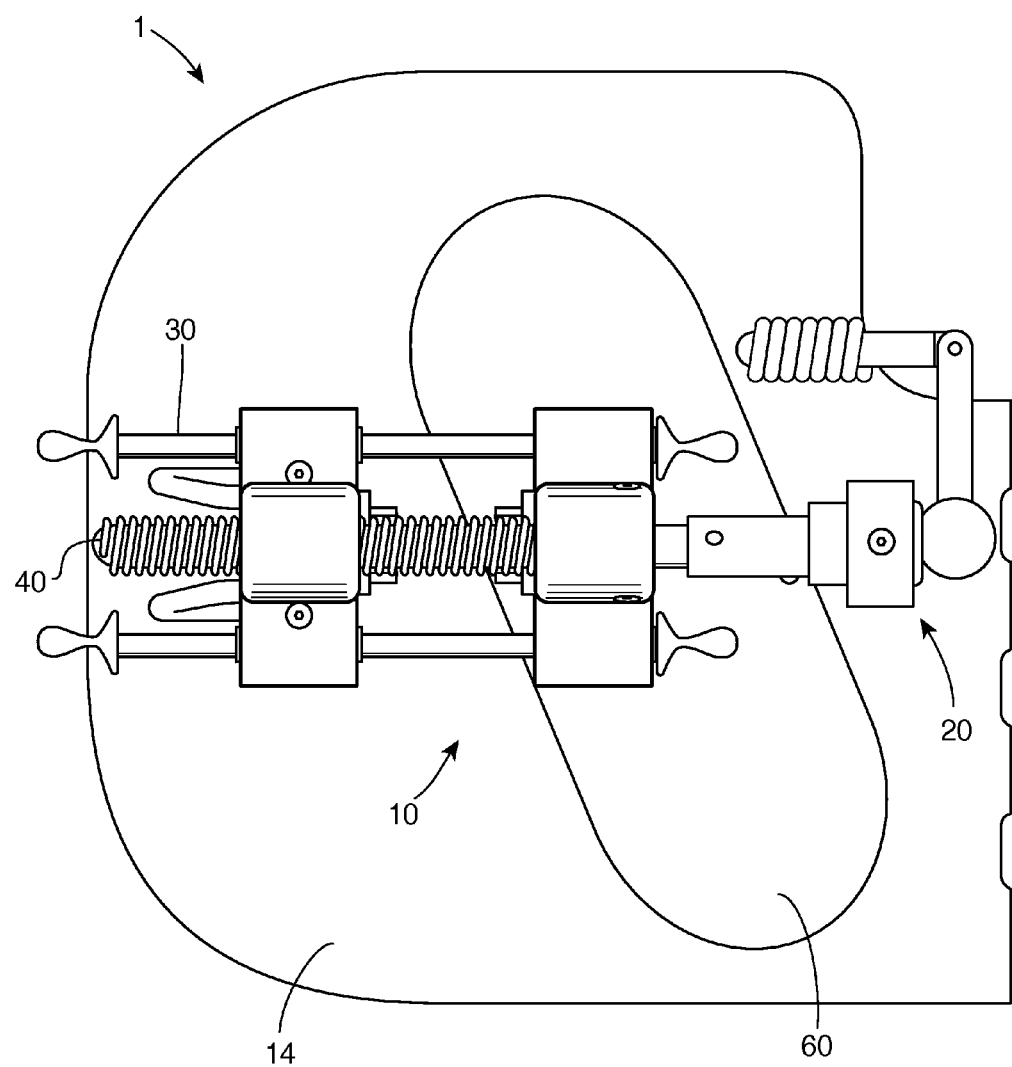
FIG. 4 is a top view of a nutcracker in accordance with the present invention.

With reference now to the drawings, and particularly to FIG. 1, there is shown a perspective view of a nutcracker 1. With reference to FIGS. 2-4, the nutcracker 1 preferably includes a cracker unit 10, a support structure 12 and a hand held base 14. The cracker unit 10 preferably includes a support base 16, a crank unit 20, a nut base 22 and a pair of jaws 26. The support base 16 preferably includes a lead screw retainer 18, a base plate 28 and a pair of guide rods 30. The guide rods 30 are pressed into an end of the base plate 28. The lead screw retainer 18 may be attached to a top of the base plate 28 with a plurality of fasteners 25 or the like, or made as an integral portion of the base plate 28. The nut base 22 preferably includes a lead screw nut 24, a nut base plate 32 and a pair of bearings 34. The pair of bearings are pressed into an end of the nut base plate 32. The pair of bearings 34 are sized to receive the pair of guide rods 30. The lead screw nut 24 may be attached to a top of the nut base plate 32 with a plurality of fasteners 25 or the like, or made as an integral portion of the nut base plate 32.

One of the jaws 26 is attached to an end of the base plate 28 and the other one of the jaws 26 is attached to an end of the nut base plate 32, such that thereof face each other. Each jaw includes a U-shaped base plate 36 and a pair of nut projections 38. An inside U-shaped contour 41 of the U-shaped base plate 36 is sized to receive a thickness of the base plate 28 and the nut base plate 32. The pair of nut projections 38 are attached to the U-shaped base plate 36 with fasteners or the like. Preferably, the pair of U-shaped base plates 36 are pivotally secured to the base plate 28 and the nut base plate 32 with pivot pins 35. The pivotability of the pair of jaws 26 allow odd shaped nuts to be retained between the pair of jaws 26.

Figure 6:
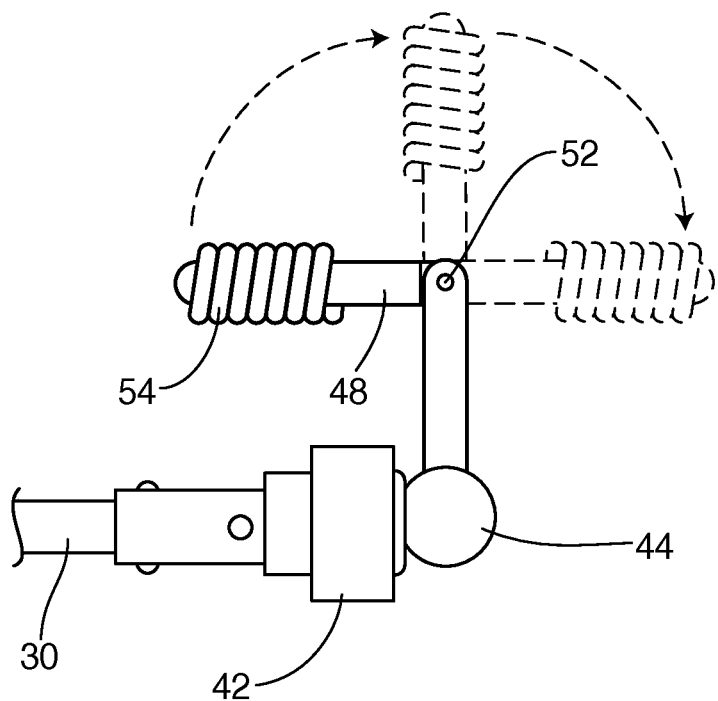
FIG. 6 is a top view of a portion of a crack unit illustrating the pivotability of a pivot crank arm relative to a crank arm of a nutcracker in accordance with the present invention.

The crank unit 20 preferably includes a lead screw 40, a ratchet mechanism 42, a crank hub 44, a crank arm 46 and a crank pivot arm 48. The lead screw retainer 18 rotatably retains the lead screw 40 with any suitable mechanism known in the art. The lead screw nut 24 threadably receives the lead screw 40. The threads of the lead screw nut 24 and the lead screw 40 are preferably acme threads or square threads, but other types of threads may also be used. The ratchet mechanism 42 is attached to one end of the lead screw 40 and a crank hub 44 preferably extends from an opposing end of the ratchet mechanism 42. Ratchet mechanisms 42 are well known in the art and need not be explained in detail. One end of the crank arm 46 is preferably threaded into the crank hub 44. With reference to FIG. 6, the crank pivot arm 48 is pivotally retained in a distal end of the crank arm 46 with a pivot pin 52. A gripping sleeve 54 may be attached to a distal end of the crank pivot arm 48.

Figure 5:
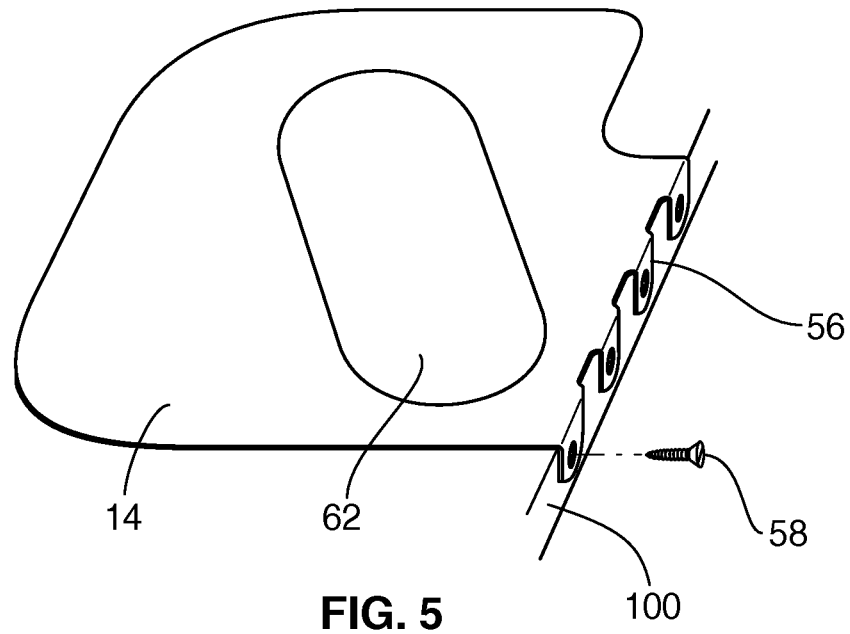
FIG. 5 is a perspective view of a hand held base of a nutcracker positioned on a support surface, illustrating optional attachment to an edge of the support surface with a fastener in accordance with the present invention.

With reference to FIG. 5, the hand held base 14 is large enough to allow a human hand to hold the nutcracker 1 on a work surface, such as a table 100. The hand held base 14 includes an attachment flange 56 for the optional attachment to the table 100 with a plurality of fasteners 58. A plurality of resilient feet 60 are preferably attached to a bottom of the hand held base 14 to prevent damage to the table 100 or the like. A gripping material 62 is preferably attached to a top of the hand held base 14. The gripping material 62 could be leather or any other suitable material.

The support structure 12 is preferably fabricated from bent rods, but could be constructed from any suitable material. A bottom of the support structure 12 is attached to the hand held base 14 with fasteners or welding. A bottom of the nut base plate 32 is attached to a top of the support structure 12 with fasteners, welding or any other suitable process. It is beneficial to angle the cracker unit 10 relative to the hand held base 14 to optimize ergonomics. In use, a nut 102 is inserted between the pair of nut projections 38 of each jaw 26. The crank arm 46 is rotated until the nut 102 is securely retained between the pair of nut projections 38. The crank arm 46 or the crank pivot arm 48 is rotated slowly, until the nut 102 cracks. If the angle of the crank arm 46 or the crank pivot arm 48 is not optimal, the ratchet mechanism 42 allows the crank arm 46 or the crank pivot arm 48 to be rotated in a direction opposite a tightening rotation to provide a better angle of attack without rotating the lead screw 40 relative to the lead screw nut 24.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A nutcracker comprising:
a crank unit includes a lead screw and a crank arm, said crank arm extends from an end of said lead screw;
a support base includes a lead screw retainer and a pair of guide rods extending from edge of said base plate, said lead screw retainer rotatably retains said lead screw;
a nut base includes a lead screw nut and a nut base plate, said lead screw nut threadably receives said lead screw, said nut base plate slidably receives said pair of guide rods, said pair of guide rods extend through both ends of said nut base plate, said nut base plate moves axially along a portion of a length of said pair of guide rods; and
a pair of jaws each one having a base with a U-shaped cross section and at least one nut retaining device retained on a front of said base, a thickness of said base plate is pivotally engaged in an inner perimeter of said U-shaped cross section of one of said pair of bases, wherein one of said pair of jaws pivots in a horizontal plane relative to said base plate, a thickness of said nut base plate is pivotally engaged in an inner perimeter of said U-shaped cross section of the other one of said pair of bases, wherein the other one of said pair of jaws pivots in a horizontal plane relative to said nut base plate, wherein rotation of said lead screw by said crank arm changes a distance between said pair of jaws.

2. The nutcracker of claim 1, further comprising:
a crank pivot arm is pivotally attached to a distal end of said crank arm.

3. The nutcracker of claim 1 wherein:
said pair of jaws are pivotally engaged with said support base and said nut base.

4. The nutcracker of claim 1, further comprising:
a crank hub is attached to an end of said lead screw, said crank arm extends from said crank hub.

5. The nutcracker of claim 1, further comprising:
a pair of guide bearings are retained in said nut base, said pair of guide bearings are sized to slidably receive said pair of guide rods.

6. A nutcracker comprising:
a crank unit includes a lead screw and a crank arm, said crank arm extends from an end of said lead screw;
a support base includes a lead screw retainer, a base plate and a pair of guide rods extending from edge of said base plate, said lead screw retainer rotatably retains said lead screw;
a nut base includes a lead screw nut and a nut base plate, said lead screw nut threadably receives said lead screw, said nut base plate slidably receives said pair of guide rods, said pair of guide rods extend through both ends of said nut base plate, said nut base plate moves axially along a portion of a length of said pair of guide rods; and
a pair of jaws each one having a U-shaped cross section, a first nut projection and a second nut projection, said first and second nut projections are retained on a front of each one of said pair of jaws, a thickness of said base plate is pivotally engaged in an inner perimeter of said U-shaped cross section of one of said pair of jaws, a thickness of said nut base plate is pivotally engaged in an inner perimeter of said U-shaped cross section of the other one of said pair of jaws, wherein rotation of said lead screw by said crank arm changes a distance between said pair of jaws.

7. The nutcracker of claim 6 wherein:
said pair of jaws are pivotally engaged with said support base and said nut base.

8. The nutcracker of claim 6, further comprising:
a crank hub is attached to an end of said lead screw, said crank arm extends from said crank hub.

9. The nutcracker of claim 6, further comprising:
a pair of guide bearings are retained in said nut base, said pair of guide bearings are sized to slidably receive said pair of guide rods.

10. A nutcracker comprising:
a crank unit includes a lead screw and a crank arm, said crank arm extends from an end of said lead screw, a crank pivot arm is pivotally attached to a distal end of said crank arm, wherein axial alignment of said crank pivot arm with said crank arm provides increased leverage when rotating said crank unit;
a support base includes a lead screw retainer, a base plate and a pair of guide rods extending from edge of said base plate, said lead screw retainer rotatably retains said lead screw;
a nut base includes a lead screw nut and a nut base plate, said lead screw nut threadably receives said lead screw, said nut base slidably receives said pair of guide rods, said pair of guide rods extend through both ends of said nut base plate, said nut base plate moves axially along a portion of a length of said pair of guide rods; and a pair of jaws each one having a base with a U-shaped cross section and at least one nut retaining device retained on a front of said base, a thickness of said base plate is pivotally engaged in an inner perimeter of said U-shaped cross section of one of said pair of bases, a thickness of said nut base plate is pivotally engaged in an inner perimeter of said U-shaped cross section of the other one of said pair of bases, wherein rotation of said lead screw by said crank arm changes a distance between said pair of jaws.

11. The nutcracker of claim 10 wherein:

said pair of jaws are pivotally engaged with said support base and said nut base.

12. The nutcracker of claim 10, further comprising:

a crank hub is attached to an end of said lead screw, said crank arm extends from said crank hub.

13. The nutcracker of claim 10, further comprising:

a pair of guide bearings are retained in said nut base, said pair of guide bearings are sized to slidably receive said pair of guide rods.

* * * * *